Patented Dec. 27, 1938

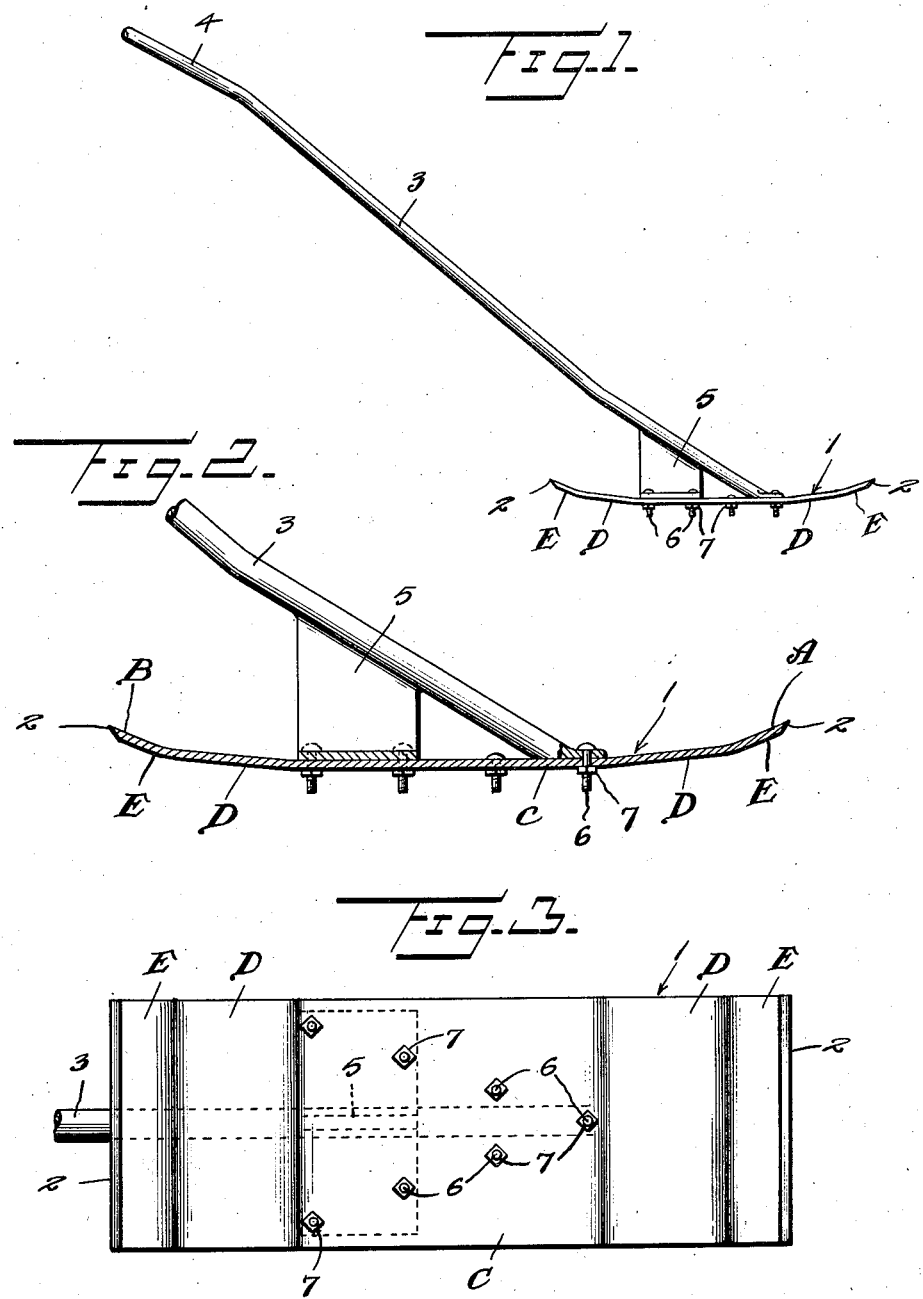

2,141,533

UNITED STATES PATENT OFFICE 2,141,533

WEEDING AND MULCHING TOOL

Theodore B. Hubbell, Lexington, Ky.

Application October 29, 1936, Serial No. 108,266

2 Claims. (Cl. 97—68)

This invention relates to a weeding and mulching tool and has for the primary object the provision of a simple hand operated device which is inexpensive to manufacture and which will permit a person to easily weed and pulverize soil and may be employed for hilling soil when desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a tool constructed in accordance with my invention.

Figure 2 is a fragmentary vertical sectional view illustrating the same.

Figure 3 is a bottom plan view illustrating the blade and pulverizing teeth.

Referring in detail to the drawing, the numeral 1 indicates an elongated blade having the opposite ends thereof sharpened to define cutting edges 2. A handle 3 is secured to the blade 1 closer to one of the cutting edges than the other and inclines upwardly from the blade with a portion thereof bent angularly to form a grip 4. A handle perch 5 is secured to the handle and to the blade. Secured to the blade are groups of pulverizing teeth 6 each in the form of a bolt secured to the blade by a nut 7. Certain of the bolts are employed for securing the handle to the blade and the perch to said blade. The groups of teeth are arranged in V-shaped formation and also in rows that converge towards one of the ends of the blade. The character A indicates the forward end of the tool or blade while the character B indicates the heel or rear end. The blade includes a straight portion C and angularly disposed portions D and E. The portions D join the portion C and slightly incline upwardly therefrom. The portions E join the portions D and incline upwardly therefrom. Thus it will be seen that the blade has four inclined portions and a straight portion.

In operation, the operator grasping the grip 4 moves the blade backwardly and forwardly over the soil so that the teeth may act on said soil to pulverize the latter and to remove weeds and other growth therefrom. Should the growth be heavy and of thick stalk the blade may be tilted so that either of the cutting edges 2 of the portions A or B will be caused to dig into the soil and sever the growth below the surface of the soil. Should it be desired to employ this tool for hilling purposes, the handle is tilted so as to bring one of the side edges of the blade in engagement with the soil and by drawing the blade over the soil the latter can be readily hilled.

Having described the invention, I claim:

1. A weeding and mulching tool comprising an elongated blade having its opposite ends sharpened to define cutting edges, a handle secured to and inclining upwardly from said blade, a perch secured to the handle above said blade, and groups of teeth secured to said blade and projecting from the lower face thereof, some of said teeth extending through said blade and connected to said perch whereby to secure said handle rigidly to said blade.

2. A weeding and mulching tool comprising an elongated blade having its opposite ends sharpened to define cutting edges, a handle above said blade and inclining upwardly relative thereto, a perch secured to the handle above said blade, and groups of teeth secured to said blade and projecting from the lower face thereof, some of said teeth extending through said perch and handle and connecting the perch and handle to said blade, said blade including a straight portion and angularly disposed portions integral therewith and a part of each angularly disposed portion being bent to a greater degree in an upward direction with respect to said straight portion.

THEODORE B. HUBBELL.